United States Patent [19]
Dodd

[11] Patent Number: 5,353,142
[45] Date of Patent: Oct. 4, 1994

[54] ELECTRO STATIC DISCHARGE PROTECTION FOR PROCESSING ACTIVE MATRIX LIQUID CRYSTAL DISPLAYS

[75] Inventor: Sonia R. Dodd, Phoenix, Ariz.
[73] Assignee: Honeywell Inc., Minneapolis, Minn.
[21] Appl. No.: 55,047
[22] Filed: Apr. 29, 1993
[51] Int. Cl.⁵ .......................................... G02F 1/1343
[52] U.S. Cl. ...................................... 359/87; 359/88; 359/54
[58] Field of Search ............................. 359/54, 87, 88

[56] References Cited

U.S. PATENT DOCUMENTS 5,148,299 9/1992 Terada .................................. 359/88
5,220,443 6/1993 Noguchi .............................. 359/54

Primary Examiner—William L. Sikes
Assistant Examiner—Huy Mai
Attorney, Agent, or Firm—John G. Shudy, Jr.

[57] ABSTRACT

An improved method for providing extended electro static discharge protection of an active matrix liquid crystal display, at the external lead contact areas by using a shorting conductor or bar to short out all row and column contacts or leads on the display, and to protect the electronics during active matrix processing, fabrication, polarizer attachment, and connecting of display leads. The display connection leads and the shorting bar on those leads, are on the front side of the active glass layer of the display. A saw is used to provide an accurate and relatively deep cut on the back side of the active glass layer thereby forming a border within the perimeter of the shorting bar on the front side of the active glass layer. The cut on the back side does not go through the active glass layer but stops several mils from the front side of the active glass layer. This method allows the shorting bar to remain intact with the display's external leads through all of the processing steps, including polarizer installation and the flex connector/driver connection, at least until active matrix liquid crystal display testing is ready to commence. After the polarizers are attached and external connections to the display contacts are made, the edge or border of the active glass layer, incorporating the shorting bar, is broken off at the cut.

5 Claims, 1 Drawing Sheet

SECTION A-A

ELECTRO STATIC DISCHARGE PROTECTION FOR PROCESSING ACTIVE MATRIX LIQUID CRYSTAL DISPLAYS

BACKGROUND OF THE INVENTION

The present invention pertains to liquid crystal displays and particularly to a method related to the fabrication of active matrix liquid crystal displays (AMLCD's). More particularly, the invention pertains to electro static discharge (ESD) protection utilizing a shorting conductor across the external contacts during the fabrication of AMLCD'S to protect the display from electro static discharge damage to the display electronics. The invention further pertains to an effective and timely removal of the shorting conductor or bar.

The related art involves the use of a scribe or a laser to cut, remove or blow away the shorting bar between the contacts of the external leads to the AMLCD. Previous methods required prematurely cutting or removing the shorting bar before the polarizers were installed and the flex connectors were connected to the liquid crystal display, thereby rendering the display still susceptible to electro static discharge damage before the completion of assembly and hookup. The present invention prevents the premature removal of the shorting conductor or bar.

SUMMARY OF THE INVENTION

The present invention is an improved method for providing extended electro static discharge protection of an active matrix liquid crystal display, at the external lead contact areas by using a shorting conductor or bar to short out, or to connect to one another, all row and column contacts on the display, and to protect the electronics during active matrix processing, fabrication, polarizer attachment and lead connection. Very low voltages on the leads of the display can cause damage. However, polarizer installation can result in voltages greater than thirty thousand volts. The shorting bar (i.e., a piece of conductive metal such as a thin-film metal line) is used to short all the row and column input connectors on the active matrix liquid crystal display at the contact areas. This short protects the array electronics, such as thin-film transistor pixel drivers, from electro static discharge caused by active matrix processing, liquid crystal display fabrication, connection and handling. The display connection leads and the shorting bar on those leads, are on the front side of the active plane of the display. The active plane is composed of very hard glass. A water-cooled diamond dicing saw, or similarly capable tool, provides an accurate and relatively deep cut on the back side of the active plane thereby forming a border within the perimeter of the shorting bar on the front side of the active plane. The cut on the back side does not go through the active plane but stops several mils from the front side of the active plane. This method allows the shorting bar to remain intact with the display's external leads through all of the processing steps, including polarizer installation and the flex connector/driver connection, at least until active matrix liquid crystal display testing is ready to commence. After the polarizers are attached and external connections to the display contacts are made, the edge or border of the active plane, incorporating the shorting bar, is broken off at the cut. The present method results in a significant reduction in manufacturing costs and a much higher percentage of yield which also reduces cost per unit. Active matrix liquid crystal display yields were only about twenty percent with any one of the related art shorting bar protection and removal techniques. The present method has increased display yields up to about eighty percent.

DESCRIPTION OF THE PREFERRED EMBODIMENT

Figure 1A:
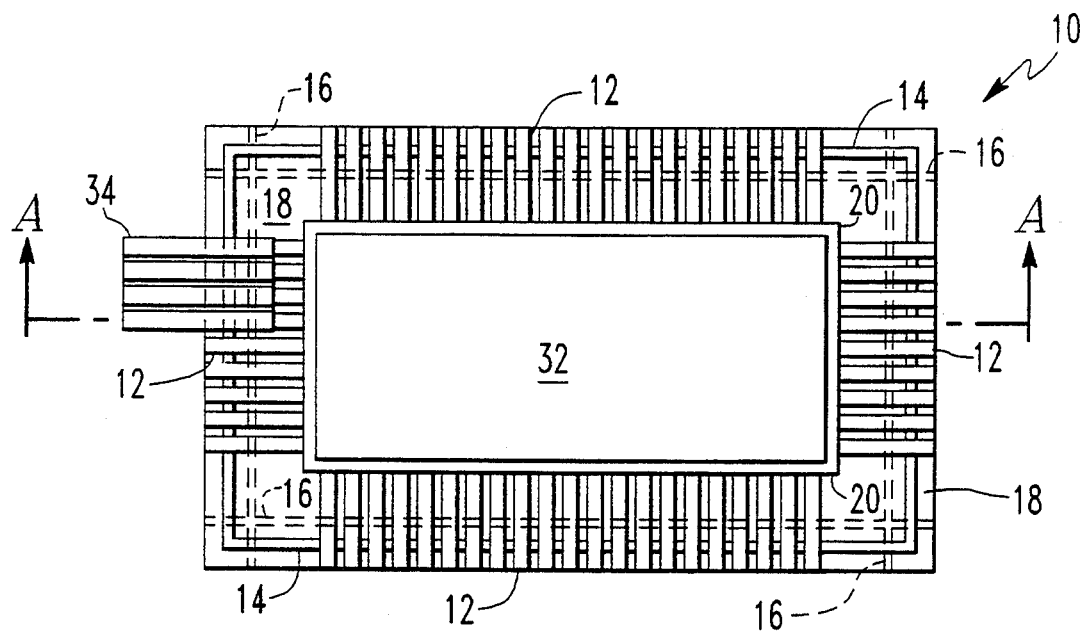
FIG. 1a is a plan view of the display showing the shorting bar and relative location of the cuts.
Figure 1B:
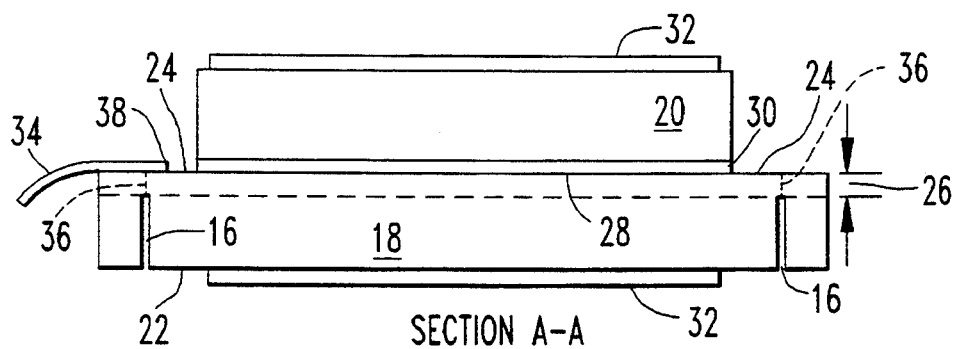
FIG. 1b is a cross-section view of the display revealing two cuts.

A shorting bar 14 (e.g., a thin-film metal line) is used to short all row and column connectors 12 on liquid crystal display 10 at contact areas 12 of FIG. 1a. This short protects array electronics 28, such as thin-film transistor pixel drivers on front side 24 of plane 18, from electro static discharge caused by AMLCD processing, fabrication and connection. Liquid crystal pixel cells 30 are situated between planes 18 and 20. Polarizers 32 would be placed on planes 18 and 20, respectively, after cuts 16 are made. Display 10 connection leads 12 and shorting bar 14 on those leads 12 are on front side 24 of active plane 18 Leads 12 may be composed of nichrome or an aluminum/copper/silicon alloy. Alternatively, leads 12 may be just an extension of the indium titanium oxide (ITO) layer on active plane 18. The thickness of leads 12 may be from 0.1 to 0.75 micron. A typical thickness for leads 12 here is about 0.12 micron. A diamond dicing saw is used to provide an accurate and relatively deep cut 16 on back side 22 of active plane 18 thereby forming a border around back plane 20, within the perimeter of the shorting bar 14 which is on front side 24 of the active plane 18 of display 10, as illustrated in FIGS. 1a and 1b. Each groove or cut 16 on the back side does not go through active plane 18 but stops at a several mil distance 26 (e.g., 0.003 inch) from front side surface 24 of active plane 18. Active plane 18 and back plane 20 are typically made of CORNING 7059 borosilicate glass. Planes 18 and 20 are either 22 or 43 mils thick. Because of the hard glass of plane 18, the diamond dice saw with water cooling, or similarly capable tool, is required to make cut 16.

The cutting method allows shorting bar 14 to remain in contact with external leads 12 through all of the processing steps, including polarizer 32 installation and flex connector 34 attachment, until AMLCD 10 testing is ready to commence. After polarizers 32 are attached and the external connections at bonds 38 to display contacts 12 are made, each edge or border incorporating shorting bar 14 is broken off at cut 16, as shown by dotted line 36. The breaking of the edge or border of plane 18 may be achieved by applying ordinary finger pressure to the edge or border.

The cutting step of active plane 18 is performed prior to attaching polarizers 32 to display planes 18 and 20, and external flex connectors 34 to leads 12 of display 10. After grooves or cuts 16 are made, polarizers 32 are applied to planes 18 and 20 of AMLCD 10. Then flex connectors 34 are bonded at points 38 to contacts 12 on active plane 18. After bonding flex connectors 34 to contacts 12, the active plane borders enclosing shorting bars 14 are snapped off at cuts 16 by bending the edges or borders of plane 18 toward front side 24. In this way, display contacts 12 can remain shorted until AMLCD 10 testing. For illustrative purposes, FIGS. 1a and 1b show only a portion of flex connectors 34 that may be attached.

The present electro static discharge protection method is much more effective and less capital expense extensive as compared to using traditional methods of shorting contact leads 12 and then cutting open shorting bar 14 between metal lines 12 with a method such as laser cutting or by blowing open shorting bar 14 with a laser. The present shorting bar 14 removal method keeps leads 12 shorted for a greater period of the processing and fabrication of display 10, is much less expensive than laser cutting and requires much less maintenance than the related art techniques. Another advantage of using the present active plane 18 sawing method over the other methods is that there is a restriction on the methods imposed by the resolution of display 10. The present saw cutting method can be performed on displays having any resolution, with no additional tooling required. Laser cutting of high resolution displays requires special and extensive tooling to maintain the needed accuracy. That is because removal of shorting bar 14 from display 10 by related art methods involves the removal of shorting bar segments between leads 12. The closer leads 12 are to one another, particularly in higher resolution displays, the more difficult it is to remove the shorting bar material 14 from between leads 12.

The present saw cutting method exposes display 10 to water because the saw is water cooled while cutting. It should be noted that display 10 subjected to water is not damaged so long as back plane 20 to the active plane 18 seal is intact which is required by the time that the cutting of slot or groove 16 commences.

The present method of shorting bar removal eliminates thin-film transistor damage due to electro static discharge, improves AMLCD yield (i.e., less line failures), improves AMLCD quality, and reduces manufacturing costs. Very significant quality improvement of the finished displays is exhibited by virtually eliminating electro static discharge damage such as open lines or shorted driver transistors during fabrication of the AMLCD.

The electro static discharge causes damage to thin-film transistors, and consequently the thin-film transistors become shorted and cause line failures which result in poor display quality. For instance, one shorted thin-film transistor is evidenced by both a row and a column failure, resulting in a "grid" effect. Several shorted transistors, due to electro static discharge, would be shown by clustered pixel failures.

I claim:

1. A method for removing a shorting conductor situated on lead contacts of a liquid crystal display, the shorting conductor shorting the lead contacts to prevent electrostatic discharge among the lead contacts to the display, the display having first and second planes, each of the first and second planes having approximately parallel first and second surfaces, having a perimeter and having a central area, wherein the lead contacts are situated on the first surface of the first plane of the display, the lead contacts extend from the central area of the first plane toward the perimeter of the first plane, and the lead contacts are for external connections to the display, said method comprising:

cutting at least one slot on the second surface into the first plane, the slot being approximately perpendicular to the second surface, the slot having a depth that goes through a portion of the first plane and the slot is about from two to four mils from the first surface of the first plane, and the slot has a location proximate to the lead contacts in an area between the shorting conductor and the central area of the first plane, and the first plane having a peripheral area extending from the slot to the perimeter of the first plane; and removing the peripheral area from the first plane, after any desired external connection or attachment to the lead contacts at points between the slot and the central area, any fabrication of the display and any installation of any polarizer, by breaking off the peripheral area at the location of the slot, thereby removing the shorting conductor from the display.

2. A method for removing a shorting conductor connected on lead contacts of a liquid crystal display, the shorting conductor interconnecting the lead contacts to prevent voltage potentials among the lead contacts to the display, the display having first and second layers, each of the first and second layers having approximately parallel first and second surfaces, each surface having a perimeter and having a central area, wherein the lead contacts are situated on the first surface of the first layer of the display, the lead contacts extend from the central area of the first layer toward the perimeter of the first layer, and the lead contacts are for external connections to the display, said method comprising:

cutting at least one slot on the second surface into the first layer, the slot being approximately perpendicular to the second surface, the slot having a depth that goes through a portion of the first layer and is about from two to four mils from the first surface of the first layer, and the slot has a location proximate to the lead contacts in an area between the shorting conductor and the central area of the first surface of the first layer, and the first layer having a peripheral area extending from the slot to the perimeter of the first layer; and removing the peripheral area from the first layer, after any desired external connection or attachment to the lead contacts at points between the slot and the central area, fabrication of the display and installation of any polarizer, by breaking off the peripheral area at the location of the slot, thereby removing the shorting conductor from the display.

3. A method for removing a shorting conductor which interconnects leads of a liquid crystal display, the shorting conductor and the leads situated on a first surface of a display layer, the display layer having a second surface approximately parallel to the first surface, said method comprising:

cutting at least one slot into the second surface of the display layer, the slot having a depth close to the first surface of the display layer, the leads and the shorting conductor; and breaking off, at the slot, part of the display layer incorporating the shorting conductor.

4. A liquid crystal display comprising: a first layer having first and second surfaces, wherein the first surface is approximately parallel to the second surface and the first surface has a central area, a perimeter, and peripheral area, the peripheral area being situated between the central area and the perimeter;

a plurality of leads situated on the peripheral area, said plurality of leads extending from the central area toward the perimeter;

a shorting conductor situated on the peripheral area, said shorting conductor being connected to said plurality of leads; and a slot situated on the second surface, said slot extending into said first layer towards a first area of the peripheral area between said shorting conductor and the central area of the first surface, wherein said slot is at a first distance from the second surface, closest to points situated in the first area, and said shorting conductor is situated in a second area of the peripheral area between the perimeter and the first area.

5. The display of claim 4 wherein said shorting conductor is removable by breaking away the second area of said first layer at the location of said slot.

* * * * *